US007711869B1

(12) United States Patent
Strickland et al.

(10) Patent No.: US 7,711,869 B1
(45) Date of Patent: May 4, 2010

(54) METHOD FOR COMMUNICATING PLURAL SIGNALS GENERATED AT A SOURCE TO A REMOTE DESTINATION THROUGH A SINGLE WIRE

(75) Inventors: Stephen E. Strickland, Foxboro, MA (US); Alex Joseph Sanville, Chelmsford, MA (US); Douglas Sullivan, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 307 days.

(21) Appl. No.: 11/960,759

(22) Filed: Dec. 20, 2007

(51) Int. Cl.
*G06F 3/00* (2006.01)
*G06F 11/00* (2006.01)

(52) U.S. Cl. .................. 710/15; 710/104; 710/8; 710/301; 713/1; 714/21

(58) Field of Classification Search .............. 710/1–2, 710/8–19, 100, 104, 300–304; 714/21–26
See application file for complete search history.

(56) References Cited

U.S. PATENT DOCUMENTS

| 4,875,209 | A | * | 10/1989 | Mathewes et al. | 714/703 |
|---|---|---|---|---|---|
| 4,881,230 | A | * | 11/1989 | Clark et al. | 714/712 |
| 5,297,261 | A | * | 3/1994 | Kuranaga | 710/104 |
| 5,414,835 | A | * | 5/1995 | Iijima | 710/1 |
| 5,815,647 | A | * | 9/1998 | Buckland et al. | 714/3 |
| 6,393,558 | B1 | * | 5/2002 | Kim | 713/1 |
| 6,393,576 | B1 | * | 5/2002 | Gates et al. | 713/600 |
| 6,810,439 | B2 | * | 10/2004 | Benson | 710/16 |
| 7,543,191 | B2 | * | 6/2009 | Li | 714/43 |
| 2004/0205420 | A1 | * | 10/2004 | Seeley et al. | 714/57 |
| 2008/0059852 | A1 | * | 3/2008 | Oodate et al. | 714/719 |
| 2008/0082866 | A1 | * | 4/2008 | Li | 714/43 |

* cited by examiner

*Primary Examiner*—Christopher B Shin

(57) ABSTRACT

A system having a processor, a printed circuit board, and an adapter board, coupled to the processor through the printed circuit board. The adapter board provides a first signal having a first state when the adapter board is in a proper operating condition and a second state when the adapter board is in an improper condition. The adapter board produces a second signal having the second state for less than a predetermined time when an adapter board requires a reset signal from the processor. The adapter board combines the first signal with the second signal a single signal fed to the processor through the printed circuit board. When the processor detects that the single signal is in the second state for a time less than the predetermined period of time, the process interprets the single signal as indicating the adapter board requires a reset.

10 Claims, 4 Drawing Sheets

METHOD FOR COMMUNICATING PLURAL SIGNALS GENERATED AT A SOURCE TO A REMOTE DESTINATION THROUGH A SINGLE WIRE

TECHNICAL FIELD

This invention relates generally to method and system for communicating plural signals from a source to a remote destination through a single wire and more particularly to expandable systems whereon additional, remotely positioned components are required to communicate through an existing printed circuit board.

BACKGROUND

As is known in the art, large mainframe computer systems and data servers sometimes require large capacity data storage systems. One type of data storage system is a magnetic disk storage system. Here a bank of disk drives and the computer systems and data servers are coupled together through an interface. The interface includes CPU controllers, commonly referred to as storage processors (SPs), which operate in such a way that they are transparent to the computer. Typically a pair of such processors is used for redundancy. That is, data is stored in, and retrieved from, the bank of disk drives in such a way that the mainframe computer system or data server merely thinks it is operating with one mainframe memory. One type of data storage system is a RAID data storage system. A RAID data storage system includes two or more disk drives in combination for fault tolerance and performance.

As is also known in the art, it is sometimes desirable that the data storage capacity of the data storage system be expandable. More particularly, a customer may initially require a particular data storage capacity. As the customer's business expands, it would be desirable to expand the corresponding data storage capacity of the purchased storage system.

One such data storage system is shown in FIG. 1 to include an interface coupled between a host computer/server and a bank of disk drives. The interface includes, in this example, a pair of vertical, rack mounted storage processors (SPA) and (SPB) interconnected though a printed circuit board, such as a printed circuit board or backplane. Each SP is coupled to the host computer/server and/or bank of disk drives through an IO card. It is noted that with the interface shown in FIG. 1, each SP has plugged into it a pair of front mounted IO cards. The interface also includes a pair of remote IO cards for connection to the host computer/server; remote in the sense that remote IO cards, here designated as remote annex IO cards, are displaced in position from the SP and hence do not plug directly into the SP but connect the SP through the backplane. That is, the remote annex IO cards are physically remote from the SP are therefore connected to the SP through the printed circuit board. It is noted that connections to the host computer/server are referred to as front end connections and connections to the bank of disk drives are referred to as back end connections.

Each one of the pair of remote annex IO cards is connected to a corresponding one of the pair of SPs. However, as noted above, the remote annex IO card A is connected, through the printed circuit board, to SPA and remote annex IO card B is connected, through the printed circuit board, to SPB. The connections of an exemplary one of the SPs, here SPA is shown in FIG. 2. It is noted that there are a limited number of discrete signals to use for status (i.e., Insert, Power Good, Reset, Power Enable, etc) reporting back from the IO card to the Storage Processor. Here, in the arrangement shown in FIG. 2, each IO card has four pins, one for the each of the status signals: Insert (indicating to the SP that the IO card has been inserted into the SP); Power Good (indicating to the SP that the power on the IO card is proper); Reset from the SP to reset (i.e., reboot the IO card); and Power Enable from the SP to enable power for the IO card. The same signals are used for the remote annex IO card. While the four status signals are passed directly between the pair of IO cards and a reset microcontroller of the SP (since the two IO cards are plugged into the SP), the status signals between the remote annex IO card and the SP are through the printed circuit board because, as shown in FIG. 1, the remote annex IO card, unlike the IO cards, are not behind the SP.

It is noted in FIG. 2 that the SP includes a CPU complex that communicates with the reset microcontroller on the SP and a microcontroller on the remote annex IO card through an I²C (Inter-Intergrated Circuit) interconnect. The card includes a power monitor and control circuit which receives the power enable signal from the SP through the printed circuit board and reports whether or not the power on the remote annex IO card to the SP though the printed circuit board. The insert signal is produced by a microcontroller on the remote annex IO card to the reset microcontroller in the SP through the printed circuit board, and such microcontroller receives a reset (or boot) signal from the SP through the printed circuit board. The signals on the I²C interconnect provide environmental data, such as temperature, to the CPU complex on the SP.

It is noted that the presence or absence of an IO card is detectable by the SP through an inserted signal sent to the SP by the IO card. This, inserted signal is useful in adapting the system to hot pluggable/hot removable IO cards. It is also noted that the remote annex card has its inserted signal fed to the SP through a single line in the printed circuit board.

While the system described above in connection with FIGS. 1 and 2 are useful with system having one remote IO card, it would be desirable to expand the number of remote IO cards that communicate to the SP without requiring changes to the printed circuit board, particularly to the number of pins used on the printed circuit board. It is also desirable that each one of the remote IO cards be hot pluggable/hot removable. Thus, in order for the system to operate with a plurality of hot pluggable/hot removable remote IO card, the reset microcontroller on the SP would have to receive some kind of signal to know whether any one of the pluralities of remote IO cards has supplied an inserted signal. However, the addition of pins for more than one remote IO card is not available in the printed circuit board.

SUMMARY

In accordance with the present invention, a system is provided having a processor, a printed circuit board, and an adapter board, coupled to the processor through the printed circuit board. The adapter board provides a first signal having a first state when the adapter board is in a proper operating condition and a second state when the adapter board is in an improper condition. The adapter board produces a second signal having the second state for less than a predetermined time when an adapter board requires a reset signal from the processor. The adapter board combines the first signal with the second signal into a single signal fed to the processor through the printed circuit board. When the processor detects that the single signal is in the second state for a time less than the predetermined period of time, the process interprets the single signal as indicating the adapter board requires a reset.

In one embodiment, a system is provided having a processor, a printed circuit board, and an adapter board, coupled to the processor through the printed circuit board. The adapter board provides a first logic signal having a first logic state when the adapter board is in a proper operating condition, such first logic signal switching to a second logic state when the adapter board is in an improper condition. The adapter board produces a second logic signal having the second logic state for less than a predetermined time when an adapter board requires a reset signal from the processor. The adapter board combines the first logic signal with the second logic signal a single logic signal, such single logic signal being fed to the processor through the printed circuit board. When the processor detects that the single signal has switched to the second logic state for greater than the predetermined time, the processor interprets the single signal as indicating improper condition of the adapter board, whereas, if the processor detects that the single signal has the second logic level for a time less than the predetermined period of time, the process interprets the single signal as indicating the adapter board requires a reset and wherein such processor provides such reset to the adapter board.

In one embodiment, the proper operating condition is when the adapter board has proper power and the improper operating condition is when the adapter board has insufficient power.

In one embodiment, the second logic signal indicates that an IO card has been inserted into or removed from the adapter board.

In one embodiment, a system is provided having a processor, a printed circuit board, an adapter board, coupled to the processor through the printed circuit board, and a plurality of IO cards for insertion into, or for removal from, the adapter board. The adapter board provides a first logic signal having a first logic state when the adapter board is in a proper condition, such logic signal switching to a second logic state when the adapter board is in an improper condition. Each one of the IO cards produces an inserted logic signal sensed by the adapter board when such one of the IO cards is inserted into the adapter board, such adapter board producing a logic signal having the second logic state for less than a predetermined time when an IO card is inserted into the adapter board. The adapter board combines the first logic signal with the inserted signal into a single logic signal, such single logic signal being fed to the processor through the printed circuit boards. When the processor detects that the single signal has the second logic state has switched to the second logic state for greater than the predetermined time, the processor interprets the single signal as indicating improper condition of the adapter board, whereas, if the processor detects that the single signal has the second logic level for a time less than the predetermined period of time, the interprets the single signal as indicating insertion of one of the remote IO cards.

In another embodiment, a system is provided having a printed circuit board, a plurality of stacked, rack mounted processors plugged into the printed circuit, and an adapter board, plugged into the printed circuit board. The adapter board is separated from a first one of the processors by a second one of the processors. The adapter board is electrically coupled to the processors through the printed circuit board. The system includes a plurality of IO cards for insertion into, or for removal from, the adapter board. The adapter board provides a first logic signal, such first logic signal having a first logic state when the adapter board is in a proper condition, such first logic signal switching to a second logic state when the adapter board is in an improper condition. Each one of the IO cards produces an inserted logic signal sensed by the adapter board when such one of the IO cards is inserted into the adapter board, such adapter board producing a second logic signal having the second logic state for less than a predetermined time when an IO card is inserted into the adapter board. The adapter board combines the first logic signal with the inserted signal into a single logic signal, such single logic signal being fed to the first processor through the printed circuit boards. When the first processor detects that the single signal has the second logic state has switched to the second logic state for greater than the predetermined time, the first processor interprets the single signal as indicating improper condition of the adapter board, whereas, if the first processor detects that the single signal has the second logic level for a time less than the predetermined period of time, the first interprets the single signal as indicating insertion of one of the remote IO cards.

Thus, in a typical, a Power Good signal is asserted once the adapter board has powered up and all of the voltage regulators are within the specified range. If one of these regulators were to go out of the specified range, a voltage monitor circuit would negate the Power Good signal. Logic on the processor would then power off the adapted board because of the Power Not Good condition. Because of the nature of the power good signal, the system in accordance with the invention, detects whether the Power Good signal is held as a Power Not Good signal for greater than a predetermined time, e.g., 5 seconds, thereby indicating that such Power Good signal is a true Power Not Good condition. Otherwise if the signal is held low for less than 5 seconds, it is a request by the adapter board for a reboot from the processor. Once the processor sees a system reset it reasserts the Power Good signal. It is noted that Power Good and Reset are two separate logical functions. Power Good only states that the regulators are supplying power in the specified ranges. The board could be in reset and still have "Power Good". Toggling the reset signal only causes a reboot of the system not a power cycle of the system.

There are several cases where the adapter card needs to cause a system reset due to either an IO card removal, insertion, or several failure scenarios. This concept can be applied to other discrete signals for designs with limited pins.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
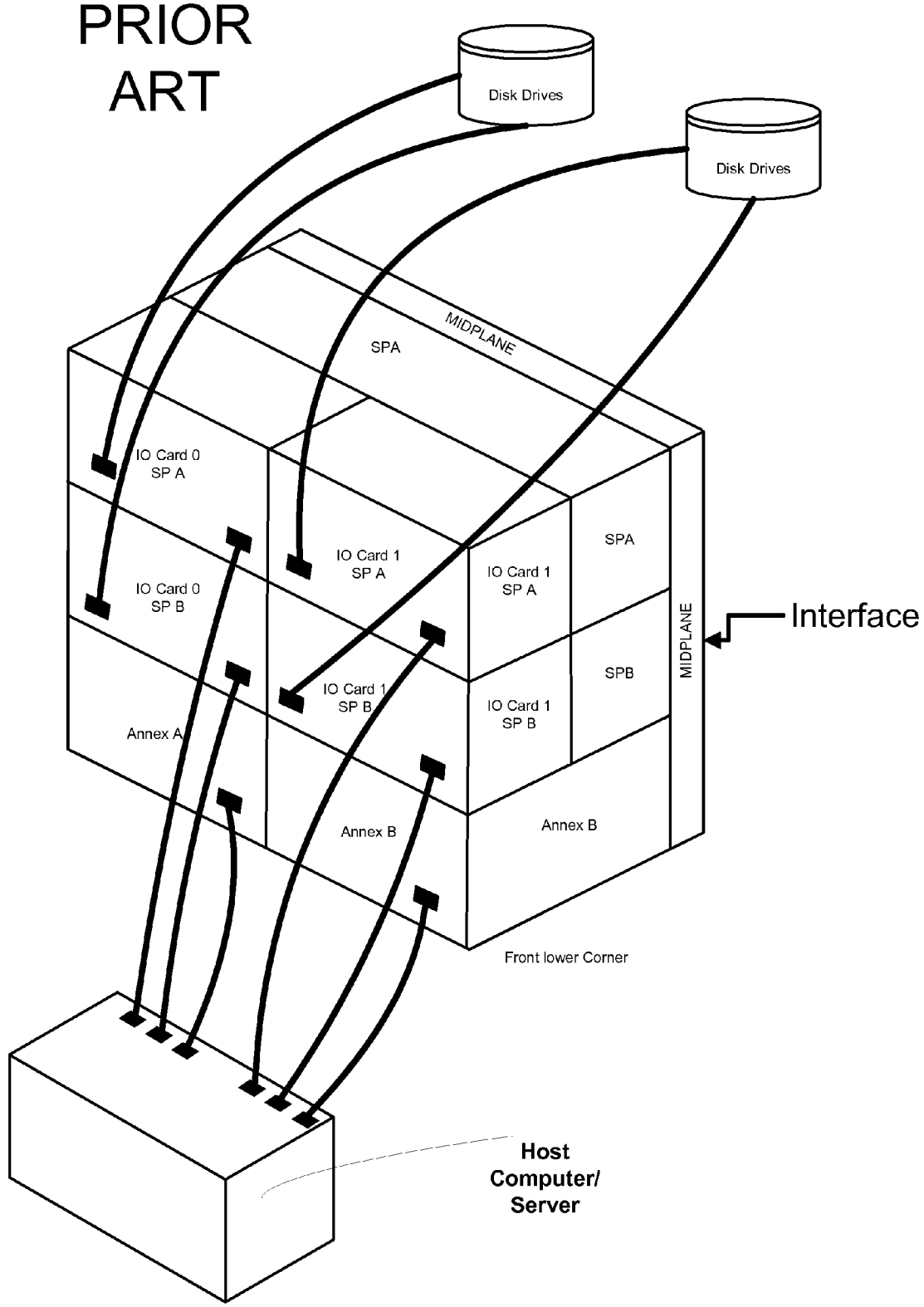
FIG. 1 is a diagram of a data storage system having an interface system according to the PRIOR ART.
Figure 3:
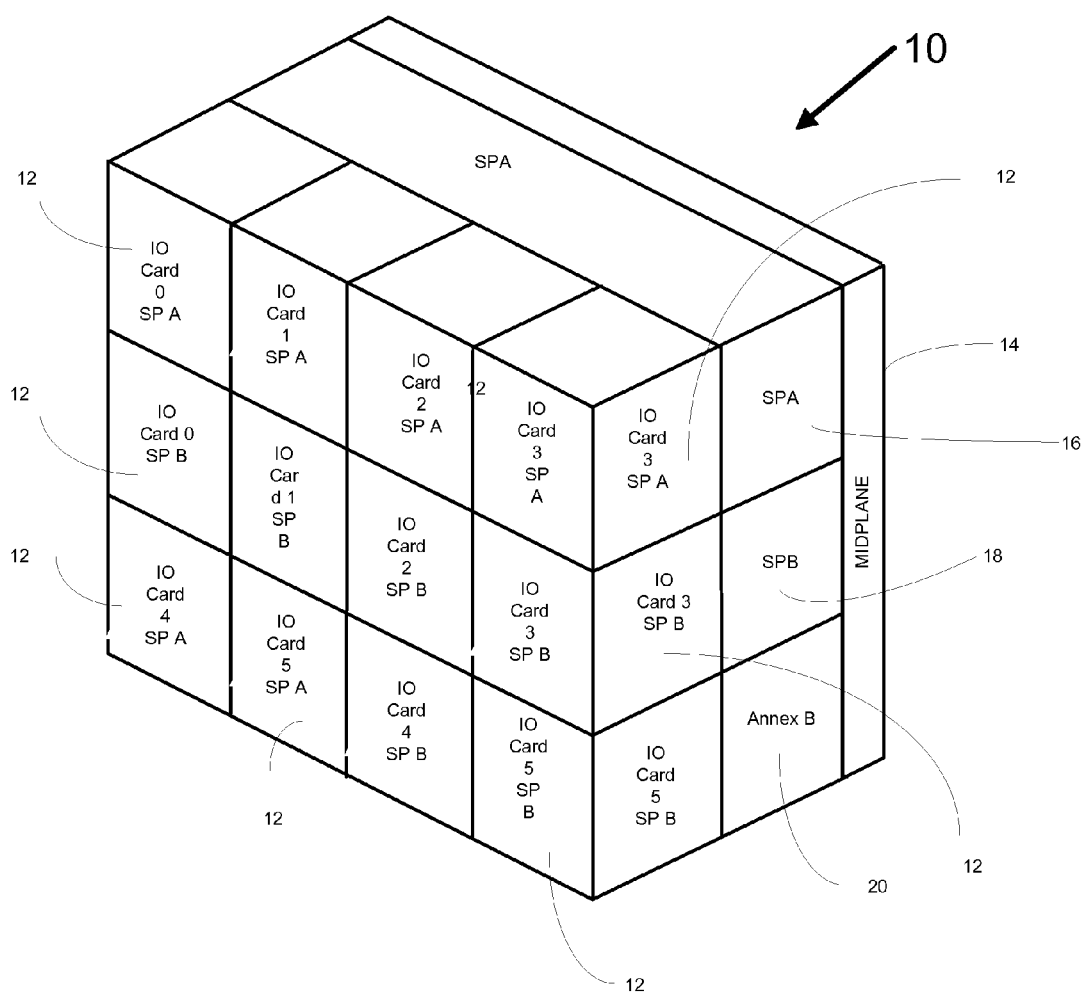
FIG. 3 is a diagram of an interface system according to the invention.

Referring now to FIG. 3, a system 10, here for example an interface for a data storage system such as that described above in connection with FIG. 1 is shown; here however, the system 10 has 12 IO cards 12 and uses the same printed circuit board 14 as used in the system shown in FIG. 1. Thus, the system 10 shown in FIG. 1 has been expanded in capability and capacity, yet uses the same printed circuit board.

The system 10 includes a plurality of, here two rack mounted storage processors (SPs) 16, 18 here vertically stacked one on top of the other, and a pair of side by side, horizontally mounted adapter boards 20, only the right hand one of the adapter boards being visible in FIG. 3. The pair of side-by-side, horizontally mounted adapter boards 20 are mounted below the lower one 18 of the pair of SPs 16, 18. The SPs 16, 18 and adapter boards 20 are interconnected through the printed circuit board 14, here a midplane. More particularly, the SPs 16. 18 and the pair of adapter boards 20 plug into the midplane 14. It is noted that each one of the pair of adapter boards 20 is connected to a corresponding one of the pair of SPs, 14, 16 as shown for an exemplary one of the SPs 16 and the adapter board 20 connected to it in FIG. 4. It is also noted that for the adapter board 20 connected to the upper SP 14, such adapter board 20 is separated from such upper one of the SPs 16 by the lower one of the SPs 18. Each one of the SPs 16, 18 has plugged into it four IO cards. Each one of the adapter boards has plugged into it two IO cards 12.

Figure 4:
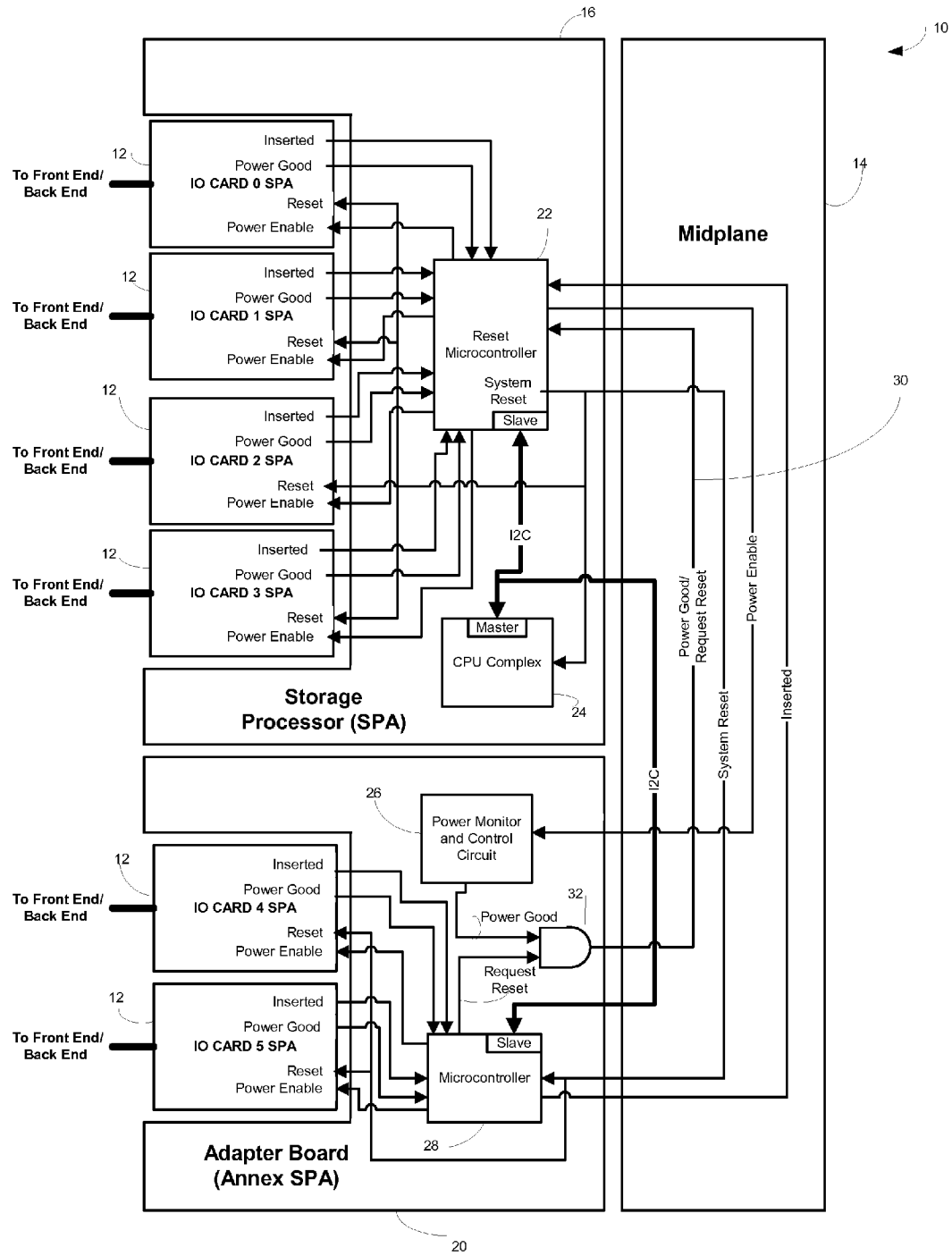
FIG. 4 is a diagram of a storage process used in the system of FIG. 3 having plugged therein four IO cards and interconnected through a backplane and IO adapter board to a pair of IO cards according to the invention.

Referring now to FIG. 4, an exemplary one of the pair of SPs. here SP 16 and the one of the adapter boards 20 connected to it through the printed circuit board 14 are shown along with the four IO cards 12 plugged into the SP 16 and the two IO cards 14 plugged into the adapter board 20

The SP 16 includes a reset microcontroller 22 and a CPU complex 24. Here the reset microcontroller 22 receives two signals from each plugged in IO cards 12: an inserted signal from each on the four IO cards 12 indicating whether the IO card 12 is plugged into the SP 16; and a power good signal indicating whether or not the plugged in IO card 12 has proper power. The reset microcontroller 22 provides two signals to each IO card 12: a power enable signal to each of the IO cards 12 plugged into it; and a reset, or reboot signal to each of the cards 12 plugged into it.

These four signals must also be coupled between the SP 16 and each of the two IO cards 12 plugged into the adapter board 20 using the same midplane 14 printed circuit wiring as that used in the system shown above in FIG. 1 which had, in effect, only one IO card.

Figure 2:
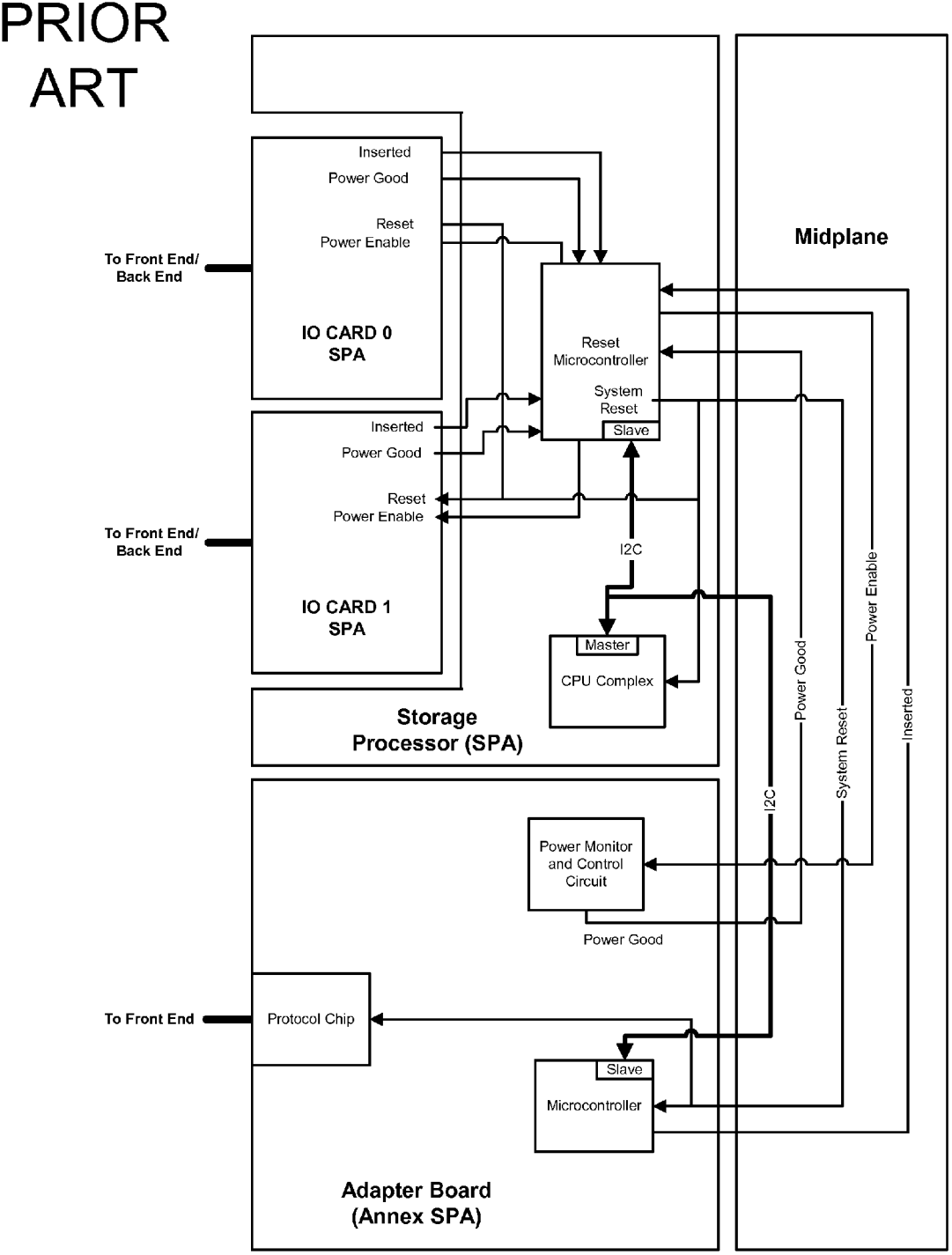
FIG. 2 is a diagram of a storage process used in the system of FIG. 1 having plugged therein a pair of IO cards and interconnected through a backplane to an IO adapter board according to the PRIOR ART.

Here the adapter board 20 includes a power monitor and control circuit 26 fed by the power enable signal produced by the SP's reset microcontroller 22. The adapter board 20 also includes a microcontroller 28 fed by the system reset signal produced by the SP's reset microcontroller 22. The adapter board microcontroller 28 sends an inserted signal to the SP 16 when the adapter board 20 is inserted into the printed circuit board 14. In order to indicate to the reset microcontroller 22 of the remote SP 16 when there is a power failure in the adapter board 20 and also when an IO card 12 is hot plugged into or hot removed from the adapted board 20, a single composite signal (power good/reset request signal) on line 30 is formed by a logic circuit 32 on the adapter board 20, such single composite signal on line 30 being fed back to the reset microcontroller 22 through the single line 30 in the printed circuit board 14. This line 30 had been used in the system of FIGS. 1 and 2 for a power good signal; now it is being used as both a power good signal and a reset request for boot up request of the adapted boards 20 and the IO cards 12 plugged into it.

More particularly, the logic circuit 32 receives a power good signal from the power monitor and control and a request reset from the adapter board microcontroller 28. The power good signal has a first logic state when the power to the adapter board 20 is proper and switches to a second logic state when the power to the adapter board 20 is not proper. The adapter board 20 microcontroller 28 produces the request reset having a first logic state and then switching to a second logic state within a predetermined period of time, T, and then returns to the first logic state when either an IO card 12 is hot plug inserted into the adapter board 20 or when an IO card 12 is hot removed from the adapter board 20. That is, a pulse at the second logic state is produced on the request reset signal to the logic circuit 32 when either an IO card 12 is not plug inserted into the adapter board 20 or when an IO card 12 is hot removed from the adapter board 20.

The logic circuit 32 produces a logic signal on the power good/reset request signal line 30 for the SP's 16 reset microcontroller 22. The SP's reset microcontroller 22 interprets whether the power good/reset request signal on line 30 is at the second logic state for greater or less than the predetermined time T. If the power good/reset request signal on line 30 is at the second logic state for less than the predetermined time T, the SP's reset microcontroller 22 send a reset signal to the adapter card 20 which then resets or reboots the IO cards 12; on the other hand, if the power good/reset request signal on line 30 is at the second logic state for greater than the predetermined time T, the SP's 16 removes the power enable signal to the adapter board 20.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
   a processor;
   a printed circuit board;
   an adapter board, coupled to the processor through the printed circuit board;
   wherein the adapter board provides a first signal having a first state when the adapter board is in a proper operating condition and a second state when the adapter board is in an improper condition;
   wherein the adapter board produces a second signal having the second state for less than a predetermined time when an adapter board requires a reset signal from the processor;
   wherein the adapter board combines the first signal with the second signal a single signal fed to the processor through the printed circuit board; and
   wherein the processor detects that the single signal is in the second state for a time less than the predetermined period of time, the process interprets the single signal as indicating the adapter board requires a reset.

2. The system recited in claim 1 wherein the proper operating condition is when the adapter board has proper power and the improper operating condition is when the adapter board has insufficient power.

3. The system recited in claim 1 wherein the second logic signal indicates that an IO card has been inserted into or removed from the adapter board.

4. The system recited in claim 3 wherein the proper operating condition is when the adapter board has proper power and the improper operating condition is when the adapter board has insufficient power.

5. A system, comprising:
   a processor;
   a printed circuit board;
   an adapter board, coupled to the processor through the printed circuit board;
   wherein such adapter board provides a first logic signal having a first logic state when the adapter board is in a proper operating condition, such first logic signal switching to a second logic state when the adapter board is in an improper condition;
   wherein such adapter board produces a second logic signal having the second logic state for less than a predetermined time when an adapter board requires a reset signal from the processor;
   wherein the adapter board combines the first logic signal with the second logic signal a single logic signal, such single logic signal being fed to the processor through the printed circuit board; and
   wherein when the processor detects that the single signal has switched to the second logic state for greater than the predetermined time, the processor interprets the single signal as indicating improper condition of the adapter board, whereas, if the processor detects that the single signal has the second logic level for a time less than the predetermined period of time, the process interprets the single signal as indicating the adapter board requires a reset and wherein such processor provides such reset to the adapter board.

6. The system recited in claim 5 wherein the proper operating condition is when the adapter board has proper power and the improper operating condition is when the adapter board has insufficient power.

7. The system recited in claim 6 wherein the second logic signal indicates that an IO card has been inserted into or removed from the adapter board.

8. The system recited in claim 7 wherein the proper operating condition is when the adapter board has proper power and the improper operating condition is when the adapter board has insufficient power.

9. A system, comprising:
   a processor;
   a printed circuit board;
   an adapter board, coupled to the processor through the printed circuit board;
   a plurality of IO cards for insertion into, or for removal from, the adapter board;
   wherein such adapter board provides a first logic signal having a first logic state when the adapter board is in a proper condition, such logic signal switching to a second logic state when the adapter board is in an improper condition;
   wherein each one of the IO cards produces an inserted logic signal sensed by the adapter board when such one of the IO cards is inserted into the adapter board, such adapter board producing a logic signal having the second logic state for less than a predetermined time when an IO card is inserted into the adapter board;
   wherein the adapter board combines the first logic signal with the inserted signal into a single logic signal, such single logic signal being fed to the processor through the printed circuit boards; and
   wherein when the processor detects that the single signal has the second logic state has switched to the second logic state for greater than the predetermined time, the processor interprets the single signal as indicating improper condition of the adapter board, whereas, if the processor detects that the single signal has the second logic level for a time less than the predetermined period of time, the interprets the single signal as indicating insertion of one of the remote IO cards.

10. A system, comprising:
    a printed circuit board;
    a plurality of stacked, rack mounted processors plugged into the printed circuit;
    an adapter board, plugged into the printed circuit board, such adapter board being separated from a first one of the processors by a second one of the processors, such adapter board being electrically coupled to the processors through the printed circuit board;
    a plurality of IO cards for insertion into, or for removal from, the adapter board;
    wherein such adapter board provides a first logic signal, such first logic signal having a first logic state when the adapter board is in a proper condition, such first logic signal switching to a second logic state when the adapter board is in an improper condition;
    wherein each one of the IO cards produces an inserted logic signal sensed by the adapter board when such one of the IO cards is inserted into the adapter board, such adapter board producing a second logic signal having the second logic state for less than a predetermined time when an IO card is inserted into the adapter board;
    wherein the adapter board combines the first logic signal with the inserted signal into a single logic signal, such single logic signal being fed to the first processor through the printed circuit boards; and
    wherein when the first processor detects that the single signal has the second logic state has switched to the second logic state for greater than the predetermined time, the first processor interprets the single signal as indicating improper condition of the adapter board, whereas, if the first processor detects that the single signal has the second logic level for a time less than the predetermined period of time, the first interprets the single signal as indicating insertion of one of the remote IO cards.

* * * * *